Feb. 24, 1970     D. H. YOUNG     3,497,686
ILLUMINATED DISPLAY APPARATUS
Filed Oct. 20, 1965     2 Sheets-Sheet 1
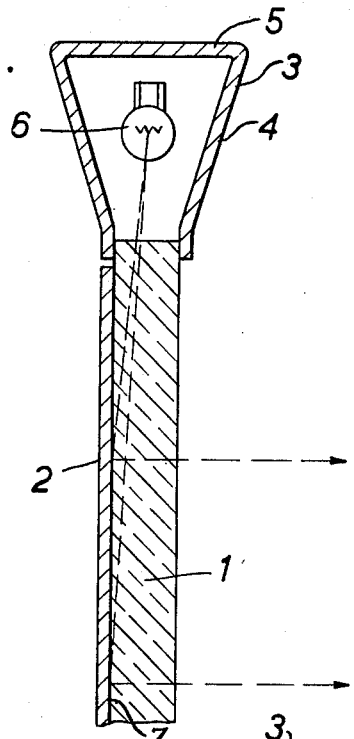
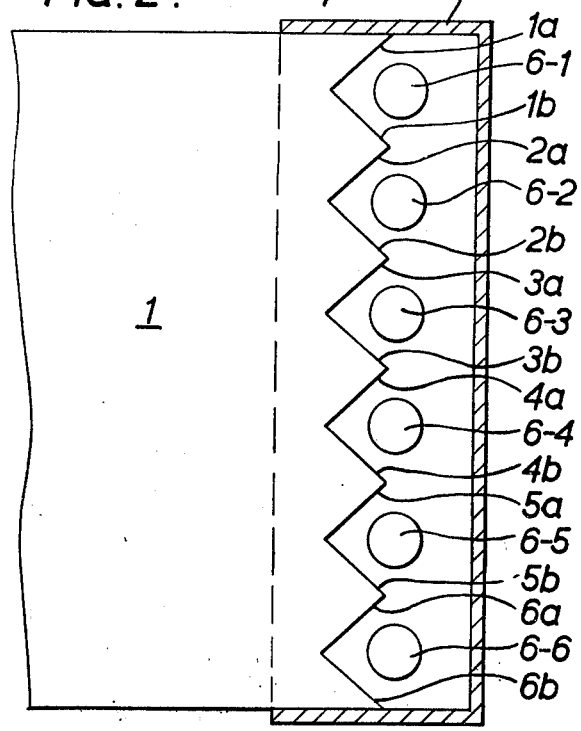

INVENTOR,
DAVID HORACE YOUNG
BY Watson, Cole, Grindle & Watson
ATTORNEYS

United States Patent Office 3,497,686
Patented Feb. 24, 1970

---

3,497,686
ILLUMINATED DISPLAY APPARATUS
David Horace Young, 69 High St., Botteralls,
Billinghurst, Sussex, England
Filed Oct. 20, 1965, Ser. No. 498,552
Claims priority, application Great Britain, Oct. 27, 1964,
43,809/64
Int. Cl. F21p 1/02
U.S. Cl. 240—1      8 Claims

ABSTRACT OF THE DISCLOSURE

A display apparatus which comprises a slab of transparent material and a reflecting surface adjacent the slab having a plurality of facets arranged in predetermined different orientations. The reflecting surface and the slab are joined by a substance having the same refractive index as the transparent material of the slab. A source of illumination is arranged along one edge of the slab to direct light into the slab to illuminate the reflecting surface in predetermined sequence.

---

Figure 3:
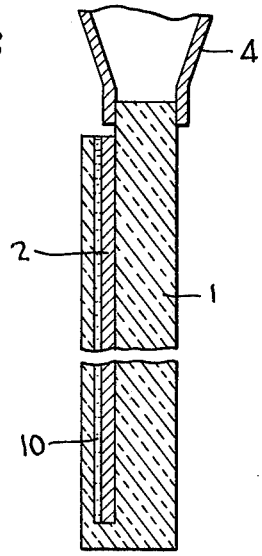

This invention relates to display apparatus comprising a light reflecting surface and means to illuminate it. More especially the invention is concerned with display apparatus of the kind comprising a reflecting surface with a multiplicity of facets arranged in predetermined different orientations and means for illuminating the facets in predetermined variable manner so that an observer looking at said surfaces sees an effect of animation, or other desired effect: such apparatus will herein be called "animation display apparatus." Various forms of animation display apparatus are described in French Patent No. 992,254 (Latrobe).

The main object of the invention is to provide a simple and compact form of display apparatus.

With this object in view, the invention provides display apparatus wherein the reflecting surface is arranged behind (from the point of view of an observer) a slab of transparent material and over substantially the whole area thereof is optically joined thereto, and the illuminating means are arranged along at least one edge of the slab to direct light through the thickness thereof. The term "optically joined" is used to indicate that there is no air layer between the transparent material and the reflecting surface: if such a layer were present light from the lamps would be prevented from reaching the facets by total internal reflection in the slab.

This transparent material may be the acrylic plastics material known under the trademark Perspex, but other materials such as glass may also be used.

The invention contemplates various ways of optically joining the reflecting surface to the slab.

Preferably the slab and the reflecting surface are optically joined by a layer of glucose liquid which solidifies in contact with the air at the edges of the surface so as to protect the liquid layer. The slab and the reflecting surface can readily be separated, and the glucose removed therefrom, by the application of hot water.

One advantage of this arrangement, then, is the convenience of removal of the reflecting surface. Another advantage is the comparative ease with which the reflecting surface can be applied to the slab. A further advantage is that the glucose liquid is non-greasy: this permits the use of materials, e.g. paper based materials, which would be adversely affected by a greasy substance as optical layer. A main advantage is that with a Perspex slab and for a given illumination the reflecting surface appears brighter than with many other materials which may be used to form the optical joint referred to, possibly because the refractive index of the glucose liquid is very close to that of the Perspex: nearly the same good results can also be obtained with a slab of ordinary crown glass, possibly for the same reason.

Other ways of optically joining the reflecting surface to the slab of transparent material are as follows:

(1) By use of glycerol, liquid paraffin, a material sold as a hair cream under the trademark Tru-Gel, plastics cement, Vaseline, clear varnish or other transparent liquid or semi-liquid material (2) By means of a sheet of transparent regenerated cellulose coated on each side with pressure adhesive (transparent regenerated cellulose coated with pressure adhesive on one side is sold under the trademark Sellotape): one side of the sheet is applied to the slab and the other to the reflecting surface (3) Where the slab is of plastics material, by laminating the reflecting surface to the slab in the manner known in the plastics art (4) By providing a pocket of water or other liquid on the rear face of the slab and dropping the reflecting surface into it.

In all cases it is desirable to eliminate all trapped air between the reflecting surface and the slab.

Figure 4:
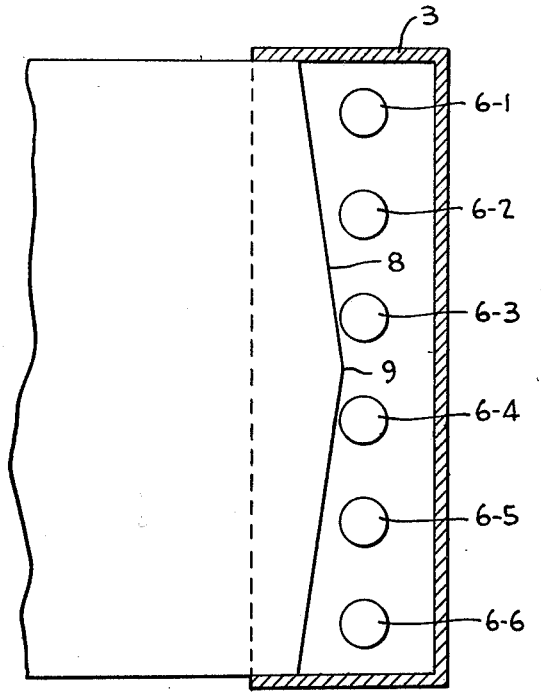

Two embodiments of the invention will now be described by way of example with reference to the accompanying diagrammatic drawings in which:

FIGURE 1 is partial section of a first animation display apparatus the section being taken transverse to the faces of the slab, FIGURE 2 is a partial sectional view of a second animation display apparatus, the section being taken parallel to the faces of the transparent slab, FIGURE 3 is a modification of FIGURE 1, and FIGURE 4 is a modification of FIGURE 2.

Referring to FIGURE 1 a rectangular Perspex slab 1 of 1"–1½" thickness has a faceted surface 2 optically joined to its rear face by a layer of glucose liquid 7. A casing 3 extends along two sides only of the slab 1: this casing has the cross-section of a truncated isoceles triangle the sides 4 of which embrace the edge of the slab and the base 5 of which supports a row of lamps 6. The lamps 6 are connected to a switching device (not shown) for illumination in a predetermined cycle. A preferred form of switching device is described in United States Patent 3,183,318 of Marcel Cyprien Kuczewski de Poray.

In operation of the apparatus light from the lamps 6 is directed into the edge of the slab 1 and travels through its thickness to reach the facets of the surface 2 at an oblique angle. It is because of the glucose layer 7 that the light is able to strike the facets instead of being totally internally reflected at the rear face of the slab. However light from the lamps reaching the front face of the slab is totally reflected. Light reflected from the facets travels more or less directly forwards to the viewer's eye. Typical rays are shown in the drawing.

The casing 3 can take the form of a narrow and shallow frame along the two sides of the faceted surface 2. The casing 3 could if desired extend all around the slab, and in some cases it will suffice to have lamps at one side only.

The apparatus shown in FIGURE 3 is a modification of that in FIGURE 1 in that a pocket 10 is provided in the slab 1 containing a glucose liquid. The faceted reflecting surface 2 is immersed in the liquid in the pocket.

The apparatus shown in FIGURE 2 is a modification of what is shown in FIGURE 1: the section of the FIGURE 2 apparatus transverse to the faces of the slab will be similar to that of FIGURE 1. In FIGURE 2 illumination is provided at one side only of the slab by six lamps 6–1, 6–2, 6–3, 6–4, 6–5 and 6–6. The edge of the slab 1 facing the lamps is formed with a series of angled surfaces 1a, 1b; 2a, 2b; 3a, 3b; 4a, 4b; 5a, 5b; 6a, 6b which provide broad notches opposite the lamps. The angled surfaces 1a, 1b; . . . 6a, 6b on the slab 1 form broad notches opposite which are disposed the lamps 6–1, 6–2 . . . 6–6. The surfaces 1a, 2a, 5b, 6b, through which light would be dissipated to the sides of the slab are provided with a reflecting surface facing the respective lamps, and the lamp casing 3 is also made reflecting, to minimize light loss. This arrangement is designed to increase the intensity of light at the central zone of the slab whereby the illumination of the faceted reflecting surface is improved. This is particularly important when the lamps are set at one side only of the slab.

Instead of forming notches along the edge or edges of the slab into which light is directed, so as to improve the illumination at the centre, the edge may be given a convex shape as shown in FIGURE 4. Thus the edge 8 as seen looking towards the faces of the slab may be formed as the two equal sides of a triangle of large apical angle 9: in a slab having faces 12″ x 12″ the height of this triangle could be 1″. The edge could alternatively be rounded.

The display apparatus according to the invention may be combined side by side with a display of known kind, such as a printed poster. A two-way sign can be made from a single slab by optically joining to it two display surfaces each of half the total area of the slab, one surface being joined to one face of the slab and the other to the other face, the display surfaces being offset. The back of each display surface is then concealed, e.g. with a poster or other display, the display surface on one face of the slab being seen simultaneously with the poster on the other face.

The slab of transparent material may be bevelled to increase the light-receiving area for a given thickness of slab. It will be preferred to bevel the slab so that the normals to the light-receiving area are directed towards the faceted surface, since in this way a more effective illumination thereof can be obtained.

The illumination of the animation display apparatus above described is by stationary lamps switched on in sequence. Alternative forms of illumination are contemplated. Thus a series of continuously illuminated lamps may be arranged on a frame surrounding the edges of the transparent slab and rotated: for this it is preferable but not essential that the slab should be of circular periphery. Alternatively continuously illuminated lamps may be placed around the edges of the slab, and an endless band (e.g. like a cinematograph film) trained around the slab and moved continuously, the band having alternate transparent and opaque portions to interrupt periodically the light from each lamp. This form of illumination could be adapted for use with a single row of lamps by training the band over rollers at each end of the row, with one run of the band between the lamps and the slab and the other outside the lamps. Such a row of continuously illuminated lamps could be replaced by a fluorescent tube.

I claim:
1. In display apparatus the combination of:
(a) a slab of transparent material;
(b) a reflecting surface comprising a multiplicity of facets arranged in predetermined different orientations said surface being located adjacent and generally parallel to a major face of said slab;
(c) a layer of a material having substantially the same refractive index as the transparent material of said slab and occupying substantially the whole of the space between the slab and the reflecting surface so as to constitute an optical joint between said surface and the aforesaid major face of the slab; and
(d) a source of illumination arranged adjacent an edge portion of the slab to direct light into the slab through the thickness thereof and adapted to illuminate said facets of the reflecting surface in predetermined variable manner so that an observer looking at said surface through the slab sees an effect of animation.

2. Apparatus as claimed in claim 1 wherein the slab is made of acrylic plastic material.

3. Apparatus as claimed in claim 1 wherein a pocket is provided, one wall of which comprises a major face of the slab, said material having substantially the same refractive index as the transparent material of said slab comprising a liquid in said pocket, said reflecting surface being immersed in said liquid in said pocket.

4. Apparatus as clamed in claim 1 wherein said reflecting surface and said slab are optically joined by a layer of glucose liquid.

5. Apparatus as claimed in claim 1 wherein said reflecting surface and said slab are optically joined by a material taken from the group consisting of glycerol, liquid paraffin, a plastic cement, and clear varnish.

6. Apparatus as claimed in claim 1 wherein said reflecting surface and said slab are optically joined by means of a sheet of transparent regenerated cellulose coated on each side with pressure adhesive.

7. Apparatus as claimed in claim 1 wherein the edge portion of said slab adjacent said source of illumination comprises a plurality of notches and said source of illumination comprises a series of lamps along the one edge only of the slab, each lamp being disposed near to and opposite a notch in said edge.

8. Apparatus as claimed in claim 1 wherein the edge portion of said slab is convex and said source of illumination comprises at least one lamp, extending along the one edge only of the slab.

References Cited
UNITED STATES PATENTS 2,701,929    2/1955    Lemelson.
3,092,728    6/1963    McMackin et al.

NORTON ANSHER, Primary Examiner

JOSEPH F. PETERS, Jr., Assistant Examiner

U.S. Cl. X.R.

40—106.52, 130; 240—10